(12) United States Patent
Akirav et al.

(10) Patent No.: US 8,892,830 B2
(45) Date of Patent: Nov. 18, 2014

(54) CHANGING OWNERSHIP OF CARTRIDGES

(71) Applicant: International Business Machines Corporation, Armonk, NY (US)

(72) Inventors: Shay H. Akirav, Petach-Tikva (IL); Aviv Caro, Modiin (IL); Ofer Leneman, Kfar Saba (IL); Itay Maoz, Haifa (IL); Uri Shmueli, Ganey Tikva (IL); Tzafrir Z. Taub, Givaataim (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/778,922

(22) Filed: Feb. 27, 2013

(65) Prior Publication Data
US 2013/0232299 A1 Sep. 5, 2013

Related U.S. Application Data

(63) Continuation of application No. 13/105,824, filed on May 11, 2011.

(51) Int. Cl.
| | | |
|---|---|---|
| *G06F 3/06* | (2006.01) | |
| *G06F 11/20* | (2006.01) | |
| *G06F 11/14* | (2006.01) | |

(52) U.S. Cl.
CPC ............ G06F 3/0682 (2013.01); *G06F 3/0646* (2013.01); *G06F 3/0647* (2013.01); G06F 3/0686 (2013.01); G06F 3/0619 (2013.01); *G06F 11/2038* (2013.01); *G06F 11/1464* (2013.01); *G06F 11/2033* (2013.01); *G06F 3/0664* (2013.01); G06F 11/1458 (2013.01); *G06F 11/2048* (2013.01); G06F 3/0637 (2013.01)
USPC ........................................... 711/161; 711/111

(58) Field of Classification Search
CPC ... G06F 3/0601; G06F 3/0605; G06F 3/0686; G06F 3/0646; G06F 3/0647; G06F 3/0664; G06F 11/1464
USPC .................................................. 711/111, 161
See application file for complete search history.

(56) References Cited

U.S. PATENT DOCUMENTS

| 7,171,532 B2 * | 1/2007 | Kodama ......................... 711/165 |
|---|---|---|
| 7,222,172 B2 | 5/2007 | Arakawa et al. |
| 7,243,103 B2 | 7/2007 | Murphy et al. |

(Continued)

FOREIGN PATENT DOCUMENTS

WO 2011014167 A1 2/2011

OTHER PUBLICATIONS

FalconStor Software, "Virtual Tape Library (VTL) Appliances," 2007, 2 pages.

(Continued)

*Primary Examiner* — Charles Rones
*Assistant Examiner* — Andrew Russell
(74) *Attorney, Agent, or Firm* — Griffiths & Seaton PLLC

(57) ABSTRACT

Exemplary method, system, and computer program product embodiments for changing ownership of cartridges, such as virtual cartridges between remotely located virtual tape libraries, are provided. In one embodiment, by way of example only, processes and protocols for the changing ownership of the cartridges are controlled from a primary location to a secondary location. The production site is moved for the cartridges. The ownership of the cartridges is waived. Access is allowed to the cartridges. Additional data is written and replicated using resources of the cartridges.

6 Claims, 7 Drawing Sheets

(56) References Cited

U.S. PATENT DOCUMENTS

| | | |
|---|---|---|
| 7,392,421 B1 | 6/2008 | Bloomstein et al. |
| 7,475,280 B1 | 1/2009 | Schlomer et al. |
| 7,577,868 B2 | 8/2009 | Aidun |
| 7,657,578 B1 | 2/2010 | Karr et al. |
| 7,689,759 B2 | 3/2010 | Bello et al. |
| 7,802,126 B2 | 9/2010 | Johnson |
| 7,870,105 B2 | 1/2011 | Arakawa et al. |
| 2003/0120676 A1 | 6/2003 | Holavanahalli et al. |
| 2003/0126107 A1 | 7/2003 | Yamagami |
| 2004/0153614 A1 | 8/2004 | Bitner et al. |
| 2005/0193235 A1 | 9/2005 | Sandorfi et al. |
| 2005/0283641 A1 | 12/2005 | Clark et al. |
| 2006/0075005 A1* | 4/2006 | Kano et al. .................. 707/204 |
| 2006/0200506 A1 | 9/2006 | DeSimone et al. |
| 2006/0294305 A1* | 12/2006 | Ballard et al. .............. 711/115 |
| 2008/0243860 A1 | 10/2008 | Cannon et al. |
| 2009/0119452 A1* | 5/2009 | Bianchi .................... 711/111 |
| 2009/0271658 A1 | 10/2009 | Aidun |
| 2009/0282203 A1 | 11/2009 | Haustein et al. |
| 2010/0031080 A1 | 2/2010 | Shangguan |
| 2010/0228916 A1* | 9/2010 | Massey et al. ............. 711/115 |
| 2010/0293349 A1 | 11/2010 | Lionetti et al. |
| 2011/0040728 A1 | 2/2011 | Akirav et al. |
| 2011/0040942 A1 | 2/2011 | Akirav et al. |
| 2011/0066799 A1 | 3/2011 | Gold |
| 2012/0284555 A1 | 11/2012 | Akirav et al. |
| 2012/0284556 A1 | 11/2012 | Akirav et al. |

OTHER PUBLICATIONS

"HP Storage Works D2D Backup Systems—Overview and Features," http://www.hp.com/cgi-bin/pf-new.cgi?IN=http%3A%2F%2Fh10010.ww...en/snn/WF05a/12169-304616-3755723-3755723-3755723-3896393.html, Hewlett-Packard Development Co., 2011, 2 pages.

Nobuhiro Maki et al., "A Proposal of Management Interface for Differential Data Exchange Mechanism on 3 Datacenter Storage Systems," IEEE, 978-1-4244-3388-9/09, 2009, 4 pages.

David Hill, "FalconStor Heats up VTL Deduplication and the Data Deduplication War," PUND-IT, Inc., Weekly Review, vol. 5, Issue 27, Jun. 3, 2009, 5 pages.

"IBM TSB Disaster Recovery Best Practices with EMC Data Domain De-duplication Storage," EMC, Dec. 2010, 17 pages.

"Understanding the HP Data Deduplication Strategy," Hewlett-Packard, Jul. 2009, 28 pages.

U.S. Appl. No. 13/099,277, filed May 2, 2011, 49 pages.

U.S. Appl. No. 13/099,282, filed May 2, 2011, 47 pages.

\* cited by examiner

CHANGING OWNERSHIP OF CARTRIDGES

CROSS REFERENCE TO RELATED APPLICATIONS

This application is a Continuation of U.S. patent application Ser. No. 13/105,824, filed on May 11, 2011.

FIELD OF THE INVENTION

The present invention relates in general to computers, and more particularly to changing ownership of cartridges, such as virtual cartridges between remotely located virtual tape libraries, in a computing storage environment.

DESCRIPTION OF THE RELATED ART

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components.

Virtual storage components are found in a variety of computing environments. A typical virtual storage component is the magnetic tape cartridge used via a magnetic tape drive. Multiple tape drives may be contained in a tape library, along with several slots to hold tape cartridges. Such data storage systems utilize storage components (usually direct access storage, such as disk arrays) to virtually present tape libraries or tape drives. Both types of technologies are commonly used for backup and recovery purposes. Virtual tape libraries, which integrate with existing backup software and existing backup and recovery processes, enable typically faster backup and recovery operations. It is often required that such data storage entities be replicated from their origin site to remote sites. Replicated data systems may externalize various logical data storage entities, such as files, data objects, backup images, data snapshots or virtual tape cartridges.

SUMMARY OF THE DESCRIBED EMBODIMENTS

Managing a multi site production environment is a formidable task within a data storage system. Within these multi site production environments, the data storage centers with virtual tape cartridges confront day-to-day backup and replication cycles. Such processes may suffer lack of synchronization over a virtual tape cartridge owner, loss of data, and potential data corruption. As a result, efficiency and productivity may be reduced.

Accordingly, and in view of the foregoing, various exemplary method, system, and computer program product embodiments for changing ownership of cartridges are provided. In one embodiment, by way of example only, processes and protocols for the changing ownership of the cartridges are controlled from a primary location to a secondary location. The production site is moved for the cartridges. The ownership of the cartridges is waived. Access is allowed to the cartridges. Additional data is written and replicated using resources of the cartridges.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, managing a multi site production environment may be a formidable task within a data storage system. Within these multi site production environments, the data storage centers with virtual tape cartridges confront day-to-day backup and replication cycles. Such processes may suffer a lack of synchronization over a virtual tape cartridge owner, loss of data, and potential data corruption. For example, virtual cartridges may gain write permissions on two or more production sites, thus causing the data loss and corruption. Moreover, these multi site production environments may have multiple backup applications, each with its unique cartridges database. Thus, for example, if a virtual cartridge has been replicated to a different site while retaining its barcode ID, the second site may unaware that this virtual cartridge may be appended or truncated by another site. Such problems may arise when two or more cartridge instances are changed locally at each site and then a replication operation is performed for another site. If the replication data is received from two systems with different cartridge content, one of the virtual cartridges (the latter in most cases) may not be replicated and the secondary backup may not be created. Typically, within real tape systems, these problems do not arise because in order to replicate a cartridge the user will clone it to a different cartridge, meaning a different barcode ID.

In contrast, and to address the inefficiencies and performance issues previously described, the illustrated embodiments provide mechanisms for changing ownership of virtual cartridges. The mechanisms, for example, may control the processes and protocols for the changing ownership of the cartridges from a primary location to a secondary location. The production site may then be moved for the cartridges. The ownership of the cartridges may then be waived. Access may then be allowed to the cartridges. Additional data may then be written and replicated using resources of the cartridges.

Figure 1:
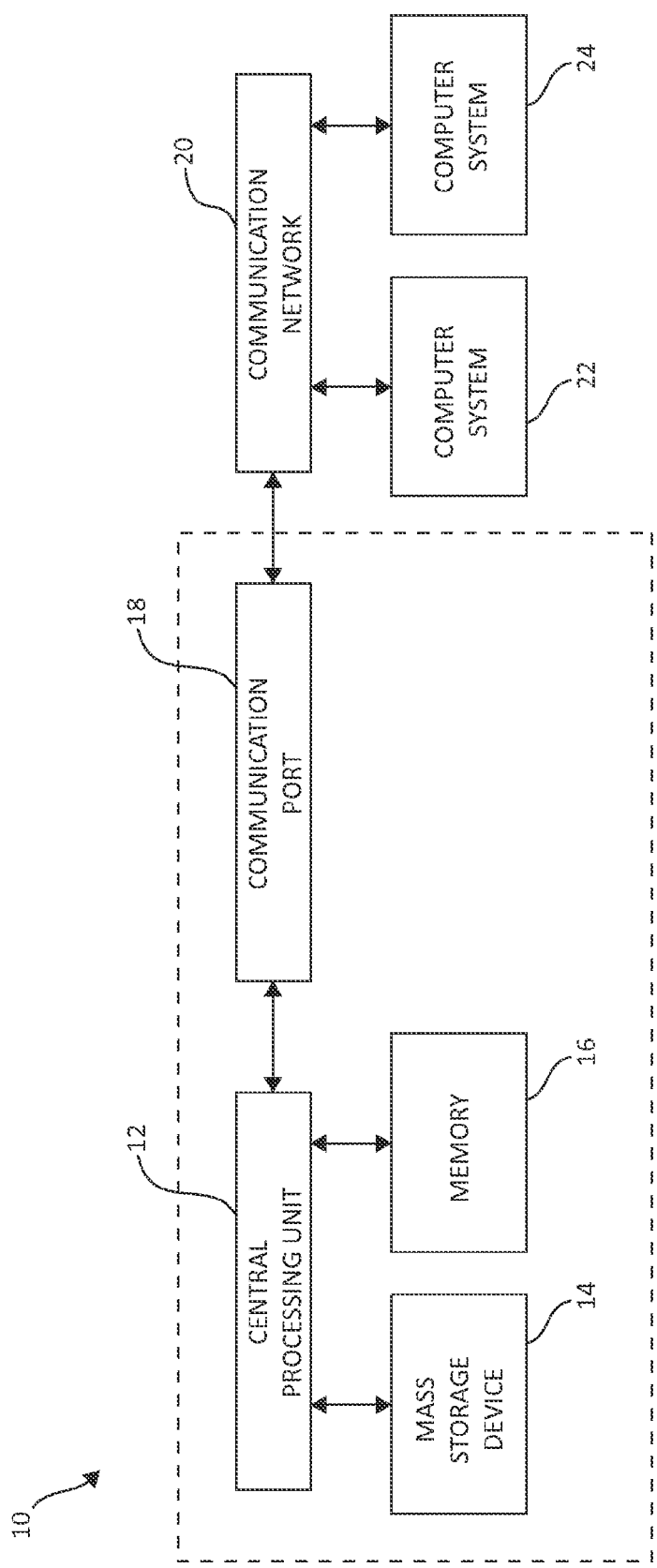
FIG. 1 illustrates a computer storage environment having an example storage device in which aspects of the present invention may be realized.

Turning now to FIG. 1, exemplary architecture 10 of data storage systems (e.g., virtual tape systems) in a computing environment is depicted. The computer system 10 includes central processing unit (CPU) 12, which is connected to mass storage device(s) 14 and memory device 16. Mass storage devices can include hard disk drive (HDD) devices, solid state devices (SSD) etc, which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
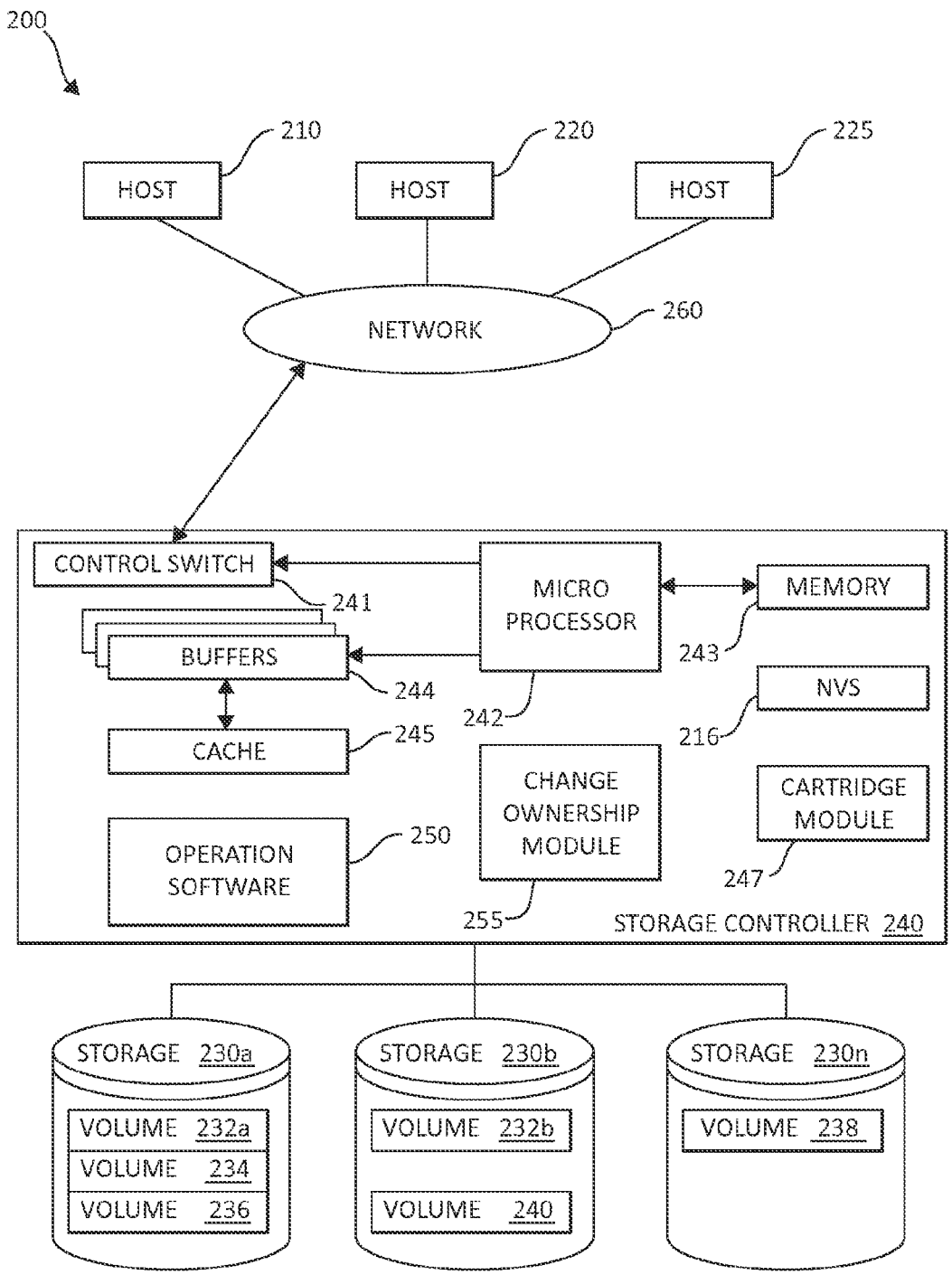
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing a part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps associated with managing storage 230 and executing the steps and methods of the present invention for changing ownership of virtual cartridges in a computer storage environment. In one embodiment, system memory 243 includes, is associated, or is in communication with the operation software 250 for changing ownership of virtual cartridges in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a change ownership module 255 and a cartridge module 247 to assist with changing ownership of virtual cartridges in a computer storage environment. The change ownership module 255 and cartridge module 247 may work in conjunction with each and every component of the storage controller 240, the hosts 210, 220, 225, and storage devices 230. Both the change ownership module 255 and cartridge module 247 may be structurally one complete module working together and in conjunction for changing ownership of virtual cartridges in a computer storage environment or may be individual modules. The change ownership module 255 and cartridge module 247 may also be located in the cache 245 or other components of the storage controller 240 to accomplish the purposes of the present invention.

The storage controller 240 may be constructed with a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, change ownership module 255, and a cartridge module 247 on which information may be set. Multiple buffers 244 may be implemented with the present invention to assist with the changing ownership of virtual cartridges in a computer storage environment.

In one embodiment, by way of example only, the host computers or one or more physical or virtual devices, 210, 220, 225 and the storage controller 240 are connected through a network adaptor (this could be a fiber channel) 260 as an interface i.e., via a switch called "Fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, change ownership module 255, and cartridge module 247 are in communication with each other and may be separate or one individual component(s). Also, several, if not all of the components, such as the operation software 245 may be included with the memory 243 for changing ownership of virtual cartridges in a computer storage environment. Each of the components within the storage device may be linked together and may be in communication with each other for purposes suited to the present invention.

Figure 3:
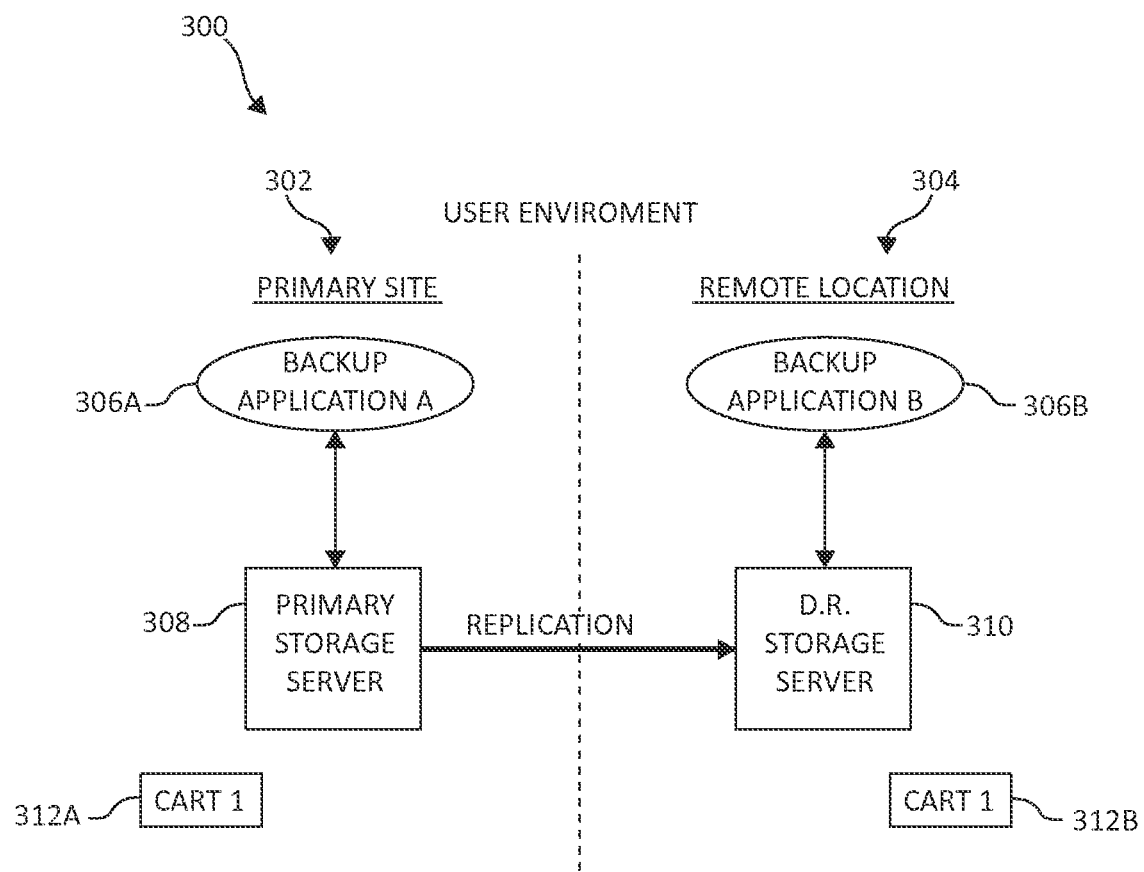
FIG. 3 illustrates an exemplary block diagram showing a computing environment when replicating virtual cartridges.

As previously mentioned, the illustrated embodiments provide mechanisms for changing ownership of cartridges (e.g., virtual cartridges between remotely located virtual tape libraries) within a computing storage environment. FIG. 3 illustrates an exemplary block diagram 300 showing a computing environment that may be adapted for replicating virtual cartridges according to the mechanisms of the illustrated embodiments. For example, a primary storage server 308, within the primary site 302, may be a backup target 306A and also share its resources for replication activity to a secondary location 304 (remote location), for example a remote site 304 that is operating in a disaster recovery mode. The secondary location 304 (remote site) may include a secondary storage server 310 (or remote server or disaster recovery server). Cart 1 312A may be locally backed up and remotely replicated.

As illustrated in FIG. 3, the mechanisms of the illustrated embodiments seek, for example, to solve the problems that surface when there are different backup application databases (306A and 306B) making it possible to write on both cartridges 312A and 312B. An additional problem the mechanisms of the illustrated embodiments seek to address includes management of a production site move, meaning the data being backed up at the primary site 302 is then changed to backing up the data to the secondary (or remote) site 304 from a certain point in time to reduce load of the primary site or for example disaster recovery test purposes. The operation to change production site requires synchronization in a replication grid context in order to define the owner of the cartridge in the grid, meaning basically, which site (system) 302 and/or 304 has write permissions enabled.

As will be described below, in one embodiment the mechanisms of the illustrated embodiments seek to provide the ability for changing ownership of virtual cartridges from a primary location to a secondary location, for example, from a member of a replication grid, such as a source system, to a specified remote system (secondary system), such as a disaster recovery remote site. Thus, the mechanisms allow for a controlled production site move for a set of cartridges (e.g., virtual cartridges), which includes a means for a system to waive the system's cartridge ownership and allow another system to gain access and/or acquire the ownership of the cartridge. The outcome may be a reduction of the load at the waiving system, for example at a primary system. By reducing the load on the waiving system, such as a primary system, additional data is allowed to be written and replicated using the waving system's resources. Thus, the waiving system (e.g., a primary source system) increases in performance with the ability to marshal or channel more replication operations to multiple destinations. The waiving system (e.g., a primary source system) is capable of running elaborated statistics faster as a result of the changing ownership capabilities.

The mechanisms of the illustrated embodiments are designed so that a grid level user may be provided with operational capabilities while also providing the waiving system's administrator the ability to choose the cartridges to waive and ask the grid level management system to perform the change ownership operation. Thus, efficiency and production is increased by the ability to move production site backups and replicate a set of cartridges to another site by reducing the backup load on a primary storage server.

Figure 4:
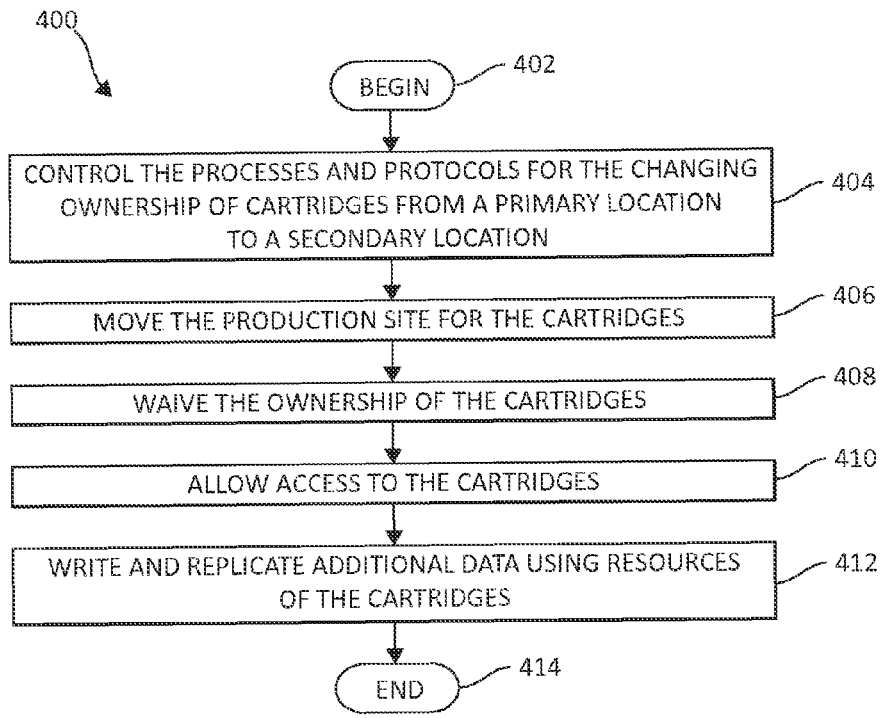
FIG. 4 is a flowchart illustrating an exemplary method for changing ownership of cartridges.

FIG. 4 is a flowchart illustrating an exemplary method 400 for changing ownership of cartridges within a computing storage environment. The method 400 begins (step 402) by controlling the processes and protocols for the changing ownership of cartridges (e.g., virtual cartridges) from a primary location to a secondary location (step 404). The production site is moved for the cartridges (step 406). The ownership of the cartridges is waived (step 408). The method 400 will then allow access to the cartridges (step 410) and will write and replicate additional data using resources of the cartridges (step 412).

Figure 5:
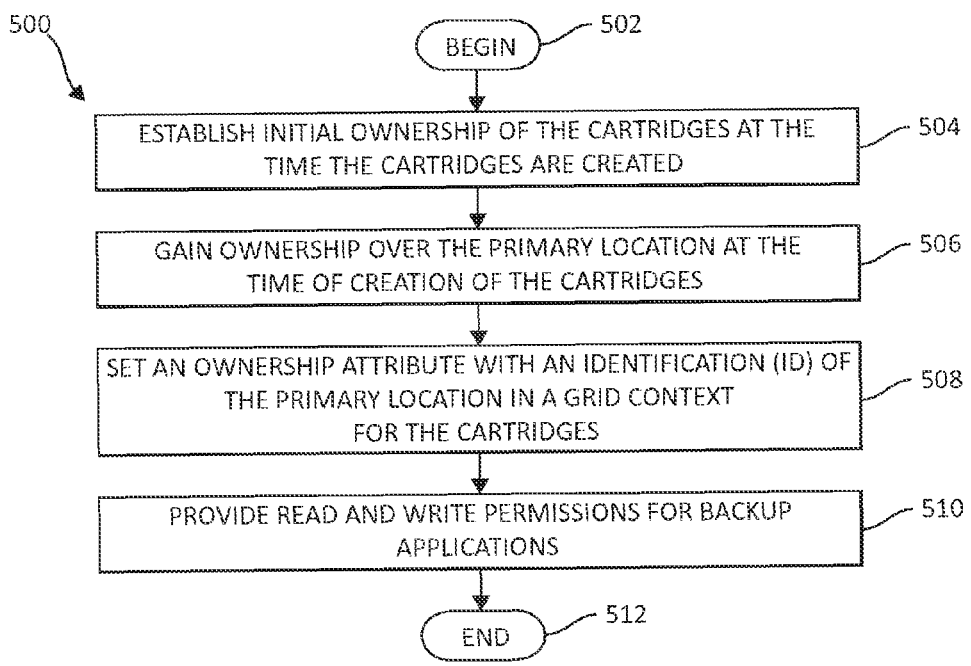
FIG. 5 is a flowchart illustrating an exemplary method for establishing initial ownership of cartridges.

In one embodiment, the mechanisms may establish initial ownership at the time a cartridge (e.g., a virtual cartridge) is created. FIG. 5 is a flowchart illustrating an exemplary method 500 for establishing initial ownership of cartridges. The method 500 begins (step 502) and establishes initial ownership of the cartridges at the time the cartridges are created (step 504). The method 500 will gain ownership over the primary location at the time of creation of the cartridges (step 506). An ownership attribute is set with an identification (ID) of the primary location in a grid context for the cartridges (step 508). The method 500 will provide read and write permissions for backup applications (step 510). The method 500 ends (512).

In an alternative embodiment, once a cartridge is created, it may gain ownership of its creator system. The ownership attribute is set with the creator system's ID in a grid context. The cartridge located in its owner's system receives read/write permissions for backup applications (meaning the cartridge may be backed up on by the backup application).

Figure 6:
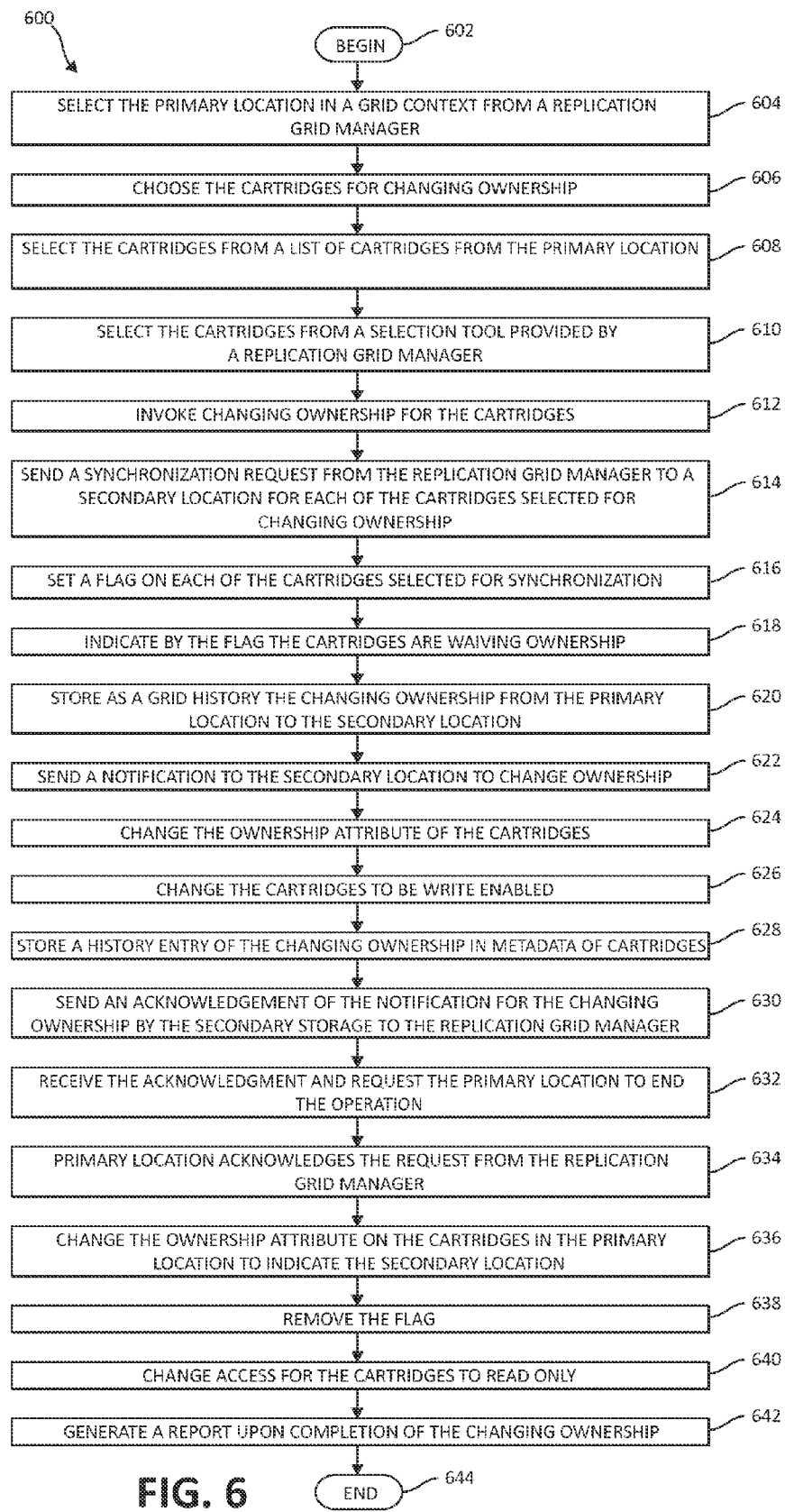
FIG. 6 is a flowchart illustrating an exemplary method for performing the processes and protocols for changing ownership of cartridges.

As mentioned above (e.g., step 404, FIG. 4), processes and protocols may be controlled for changing ownership of the cartridges from a primary location to secondary location. The processes and protocols may change a cartridge's ownership attribute, which enable a cartridge at its owner's system to waive ownership and gain ownership of a replica cartridge on a new production system. With the foregoing in mind, FIG. 6 is a flowchart illustrating an exemplary method 600 for performing the processes and protocols for changing ownership of cartridges. The method 600 begins (step 602) by selecting the primary location in a grid context from a replication grid manager (step 604). The method 600 chooses the cartridges (e.g., virtual cartridges) for changing ownership (step 606). The method 600 may select the cartridges from a list of cartridges from the primary location (step 608). The method 600 may select the cartridges from a selection tool provided by a replication grid manager (step 610). The changing ownership operations are invoked for the cartridges (step 612). A synchronization request is sent from the replication grid manager to a secondary location for each of the cartridges selected for changing ownership (step 614). A flag is set on each of the cartridges selected for synchronization (step 616). The flag indicates the cartridges are waiving ownership (step 618).

The method 600 stores as a grid history the changing ownership from the primary location to the secondary location (step 620). The method 600 will send a notification to the secondary location to change ownership (step 622). The ownership attribute of the cartridges is changed (step 624). The cartridges are changed to be write enabled (step 626). The method 600 will store a history entry of the changing ownership in metadata of cartridges (step 628). The method 600 will send an acknowledgement of the notification for the changing ownership by the secondary storage to the replication grid manager (step 630). The method 600 will receive the acknowledgment and request the primary location to end the operation (step 632). The primary location acknowledges the request from the replication grid manager (step 634). The ownership attribute on the cartridges is changed in the primary location to indicate the secondary location (Step 636). The flag is removed (step 638). The method 600 will change the access of the cartridges to read only (step 640). A report is generated upon completion of the changing ownership (step 642).

In an alternative embodiment, a user may choose a source system (primary system) in a grid context either from a replication manager component and/or by directly logging into the source system. The user may select one or a set of cartridges for the change ownership operation. The specific cartridges may be selected from a list of cartridges in the specific system's graphical user interface (GUI). The specific cartridges may be selected from a structured query language (SQL) selection tool provided through replication manager. The change ownership operation may be requested from a replication manager handling routine. The replication manager SQL selection tool may be a wizard, which may also need to invoke the change ownership operation through the replication manager.

As an example of the foregoing, consider the following. the replication manager may invoke the change ownership protocol and the change ownership protocols commence by sending a synchronization request on all selected cartridges from the replication manager to a secondary location (e.g., the targeted system). For each primary (source) cartridge that may be synchronized, a flag may be set on the cartridge to indicate it is a cartridge willingly to waive ownership on the primary (source) system. The cartridges that are not accessible will not be taken into consideration (and not retried). A report may be generated once the change ownership operation completes. The report indicates the cartridges that successfully changed ownership, the cartridges that failed to change ownership along with the reasons and causes for any failures in changing ownership. For example, reasons for the failure to change ownership may include that the cartridge is currently active in a drive (busy); the cartridge is corrupted and may not be accessed (bug); and/or there may be an intentional software block of the operation (such as in a disaster recovery (DR) testing operation).

The replication manager may store as grid history the change from system #X (the primary system) to system #Y (the secondary system). The storing the information relating to the changing of ownership operation as grid history is performed, for example, in order to allow the mechanisms to consult with all relevant systems to determine which systems (primary and/or secondary) own the various cartridges, such as when a system is operating in a DR mode. The replication manager may send a notification to the secondary system to change its ownership. The secondary system (target) acknowledges the change and changes the ownership attribute while also changing the cartridge to be write enabled. The secondary system stores a history entry of the change in the cartridge metadata for statistics and future reference. The replication manager receives the acknowledgement and requests the primary (source) system to end the operation. The primary (source) system sends an acknowledgment to the replication manager and changes the ownership attribute to indicate the secondary system. The primary (source) system removes the flag that indicates the change ownership operation needs to be performed and changes the cartridge access to read only. The primary system stores a history entry of the change in the cartridge metadata for statistics and future reference. A report of success/failure in changing ownership is generated to indicate the number of cartridges that succeeded in the change ownership operation, the number of cartridges that failed in the change ownership operation, all the barcodes and cartridges unique identifications (IDs), and also the reasons why each operation failed.

Figure 7:
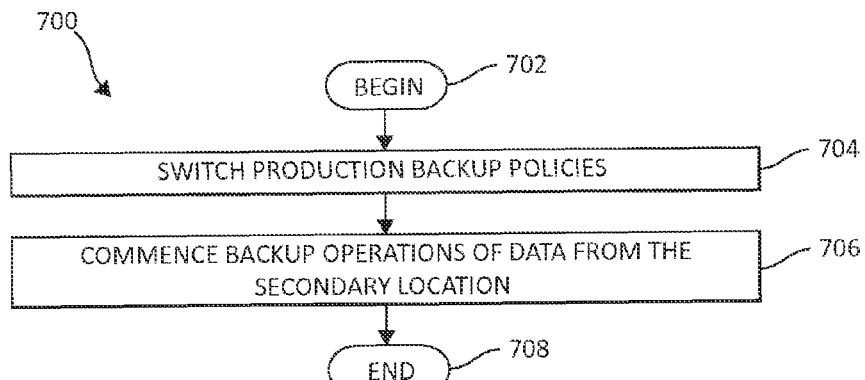
FIG. 7 is a flowchart illustrating an exemplary method for processes occurring after the change of ownership of cartridges.

Once the change of ownership of the cartridges is complete, the user may switch production backup policies and commence backing up from the secondary system (target system). FIG. 7 is a flowchart illustrating an exemplary method 700 for processes occurring after the change of ownership of cartridges. The method 700 begins (step 702) by switching production backup policies (step 704). The method 700 will commence backup operations of data from the secondary location (step 706). The method 700 ends (step 708).

Figure 8:
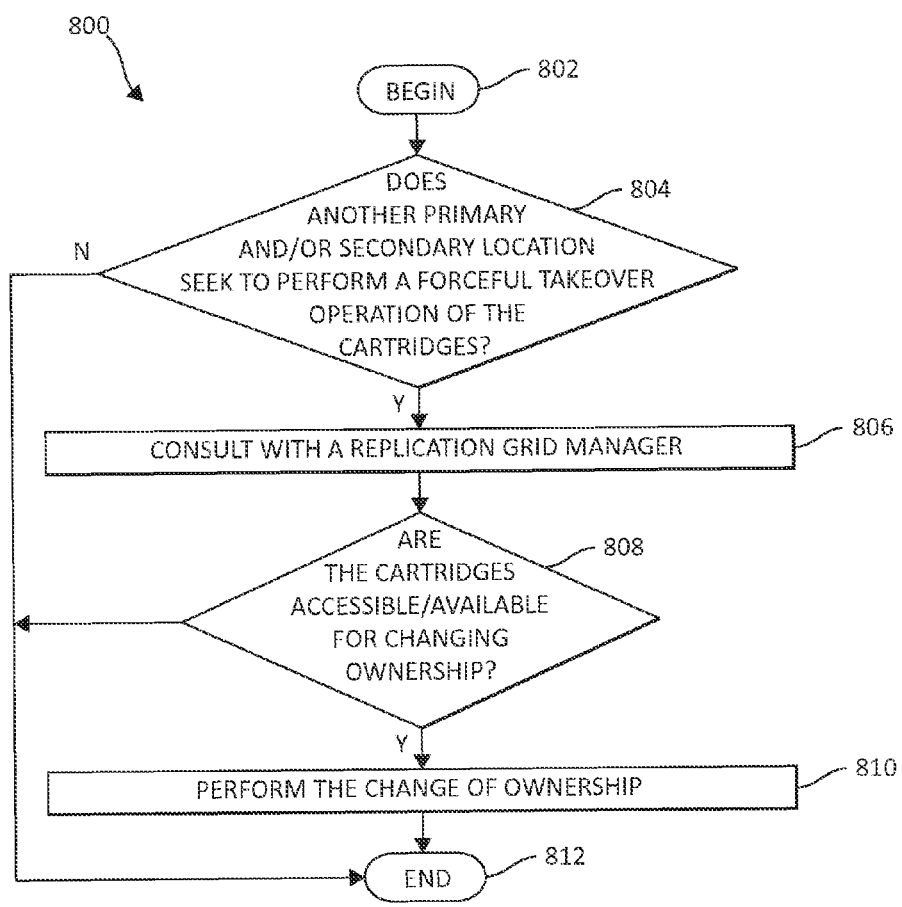
FIG. 8 is a flowchart illustrating an exemplary method for consulting with a replication grid manager for forcefully changing cartridge ownership.

In later operations, any replication grid member (primary and/or secondary system) that may want to forcefully takeover the ownership of the cartridges may need to consult the replication manager to decide if a cartridge is already owned by someone other than its original owner due to change ownership operation. FIG. 8 is a flowchart illustrating an exemplary method 800 for consulting with a replication grid manager for forcefully changing cartridge ownership. The method 800 begins (step 802) and the method 800 will check and determine if another primary and/or secondary location (such as any replication grid member) is seeking to perform a forceful takeover operation of the cartridges (Step 804). If no, the method 800 ends (step 812). If yes, the method 800 will consult with a replication grid manager (step 806). The method 800 will determine if there are cartridges accessible/available for changing ownership (step 808). If no, the method 800 ends (step 812). If yes, the method 800 will perform the change of ownership (step 810). The method 800 ends (step 812).

Thus, as illustrated above, by controlling the processes and protocols for changing the ownership of cartridges (e.g., virtual cartridges), in subsequent operations, any replication grid member (primary or secondary systems within a particular grid) that may want to forcefully takeover the ownership of a cartridge(s), may be required to consult the replication grid manager to decide if the cartridge(s) is already owned by some other system, rather than the original system that owned the cartridge prior to the change of ownership operation. Such control and processes increase the efficiency and production for changing ownership of virtual cartridges, for example.

Figure 9:
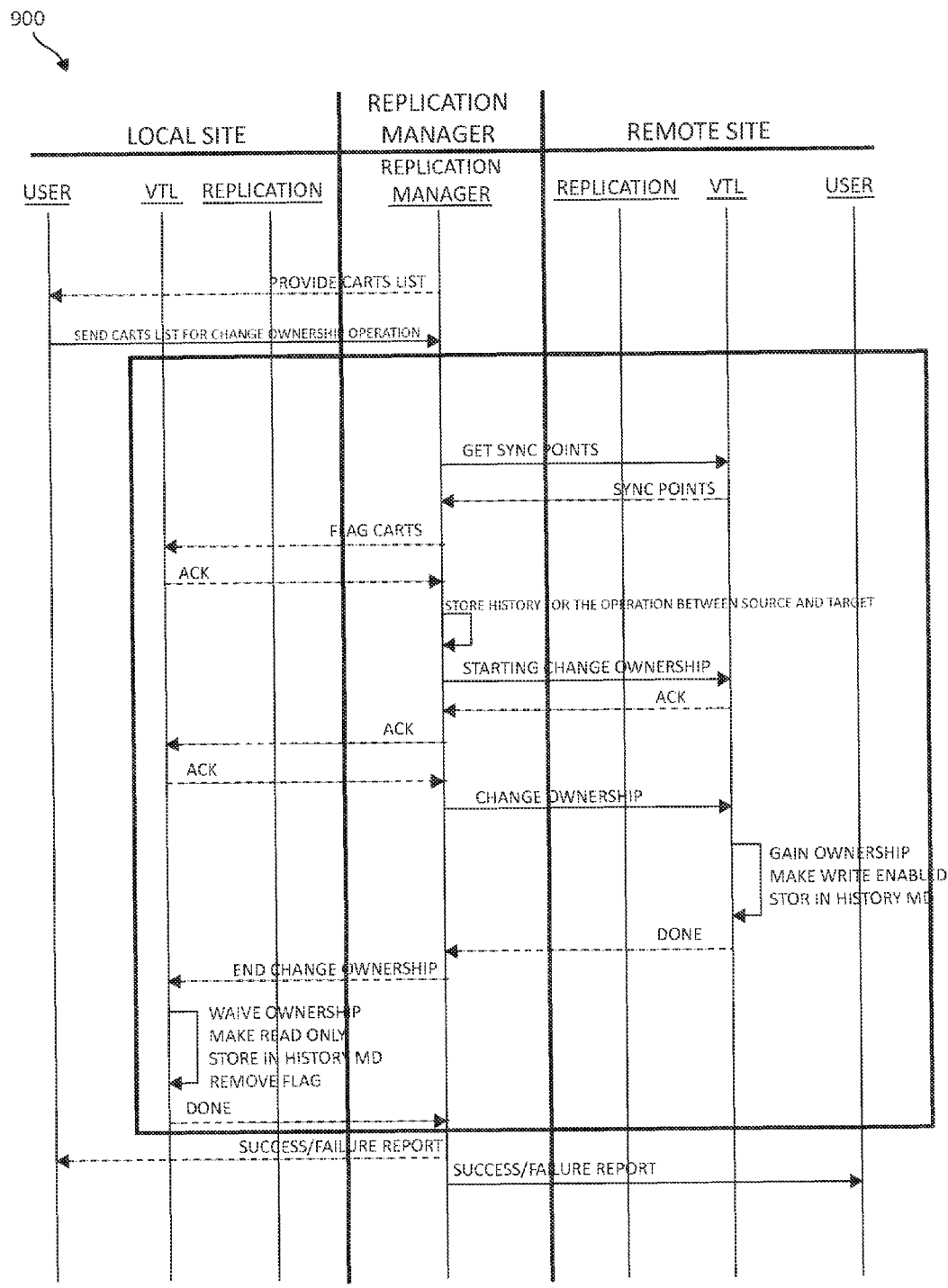
FIG. 9, illustrates an exemplary block diagram of a high level sequence of the changing ownership operation.

Turning to FIG. 9, illustrates an exemplary block diagram 900 of a high level sequence of the changing ownership operation. In one embodiment, a list of cartridges is created for changing ownership of a cartridge (e.g., a virtual cartridge). The mechanisms iteratively go through each of the cartridges. For the cartridges that are accessible and synchronized, a handshake mechanism is invoked, which is followed by a protocol to waive source ownership and gain access to the target (secondary) for ownership of the cartridge. Once the protocols for changing ownership of the cartridges have commenced, the replication grid manager indicates to itself (the replication grid manager) that the changing ownership operations are occurring and will store the changes in a history (e.g., a replication grid history) to support subsequent operations that require the knowledge of which system (primary or secondary system) is the owner of a cartridge in the grid context. At the end of the change ownership operation, the mechanisms issue a report for both the primary (source) and the secondary (target) systems to indicate the overall status of the change ownership operation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for changing ownership of a plurality of cartridges by a processor device in a computing storage environment, the method comprising:
   controlling a plurality of processes and protocols for the changing ownership of the plurality of cartridges from at least one primary location to at least one secondary location;
   selecting at least one of the plurality of cartridges from a list of the plurality of cartridges from the at least one primary location;
   sending a request to synchronize the at least one of the plurality of cartridges;
   moving a production site for the at least one of the plurality of cartridges from the at least one primary location to the at least one secondary location;
   waiving ownership of the at least one primary location of the at least one of the plurality of cartridges;
   as a result of the waiving, allowing access to the at least one of the plurality of cartridges by the at least one secondary location, wherein additional data is written and replicated using resources of the at least one of the plurality of cartridges; and
   wherein the invoking the changing ownership includes performing:
      sending a synchronization request from a replication grid manager to the at least one secondary location for each of the at least one of the plurality of cartridges selected for changing ownership,
      setting a flag on each of the at least one of the plurality of cartridges selected to be synchronized, wherein the flag indicates the waiving of the ownership of the at least one of the plurality of cartridges,
      storing as a grid history the changing ownership from the at least one primary location to the at least one secondary location,
      sending a notification to the at least one secondary location to perform the changing ownership,
      acknowledging the notification for the changing ownership,
      changing an ownership attribute of the at least one of the plurality of cartridges,
      changing the at least one of the plurality of cartridges to be write enabled,
      storing a history entry of the changing ownership in metadata of the at least one of the plurality of cartridges,
      removing the flag,
      changing access to read only for the at least one of the plurality of cartridges, and
      generating a report upon completion of the changing ownership.

2. The method of claim 1, further including establishing an initial ownership of the at least one of the plurality of cartridges, including performing:
   gaining ownership of the at least one primary location at the time of creation of the at least one of the plurality of cartridges,
   setting an ownership attribute with an identification (ID) of the at least one primary location in a grid context for the at least one of the plurality of cartridges, and
   providing one of at least a read and write permission for a plurality of backup applications.

3. The method of claim 1, further including, in conjunction with the changing ownership, performing:
   selecting the at least one primary location in a grid context from a replication grid manager, and
   directly logging into the at least one primary location.

4. The method of claim 1, wherein the controlling a plurality of processes and protocols includes performing:
   choosing the at least one of the plurality of cartridges for the changing ownership, wherein the choosing includes:
      selecting the at least one of the plurality of cartridges from a selection tool provided by a replication grid manager, and
   invoking the changing ownership for the at least one of the plurality of cartridges from a replication grid manager handling routine, wherein the selection tool is utilized for the invoking.

5. The method of claim 1, further including, upon completion of the changing ownership, performing:
   switching a plurality of production backup policies, and
   commencing a backup operation of data from the at least one secondary location.

6. The method of claim 1, further including, if one of the at least one primary location and the at least one secondary location performs a forceful takeover operation of the at least one of the plurality of cartridges, consulting with a replication grid manager to determine if the at least one of the plurality of cartridges is owned by another one of the at least one primary location and at least one secondary location.

* * * * *